Aug. 16, 1960 R. DAVIS 2,949,105
AUTOMATIC STARTING MECHANISM FOR AUTOMOTIVE VEHICLES
Filed March 17, 1958 3 Sheets-Sheet 2

INVENTOR.
ROSCOE DAVIS
BY
ATTORNEYS

Aug. 16, 1960   R. DAVIS   2,949,105
AUTOMATIC STARTING MECHANISM FOR AUTOMOTIVE VEHICLES
Filed March 17, 1958   3 Sheets-Sheet 3

INVENTOR.
ROSCOE DAVIS
BY
ATTORNEYS though a conductor 39 to the ignition coil 40 in the ignition circuit of the engine. Vacuum switch 38 also includes a second contact 42 at the same end thereof as contact 36. Contact 42 is connected by a conductor 44 with a bi-metallic switch arm 46 in a safety cut-out switch 48. Switch 48 also includes a heater 50 connected at one end with conductor 44 and at the other end to ground as at 52.

Heater 50 is disposed adjacent bi-metallic arm 46 and may be in the form of a resistance coil having a resistance of 20 ohms. Bi-metallic arm 46 when heated closes with a contact 54 that is connected with the coil of the starter solenoid 56 by a conductor 58. The other side of the starter solenoid coil is connected to ground as at 60. When the coil of solenoid 56 is energized, a switch 62 is adapted to close a circuit through the engine starter, not illustrated.

2,949,105

AUTOMATIC STARTING MECHANISM FOR AUTOMOTIVE VEHICLES

Roscoe Davis, Van Dyke, Mich., assignor, by direct and mesne assignments, to Thermo Auto-Matic Starter, Incorporated, East Detroit, Mich., a corporation of Michigan Filed Mar. 17, 1958, Ser. No. 721,753

13 Claims. (Cl. 123—179)

This invention relates to a device for automatically starting an automotive vehicle at predetermined times.

The device of the present invention has features in common with the device disclosed in my prior copending application Serial No. 637,903, filed on February 4, 1957. However, the device of the present invention includes improvements over the device disclosed in said prior copending application.

As stated above, the device of the present invention is designed for automatically starting an automotive engine. In general, the device includes a manually set timer in the form of an electrical switch which is incorporated in the starting system of the engine so that when it is closed, the engine will automatically start. The device also includes a cut-out switch which renders the timer switch ineffective to close a circuit through the engine starter after the engine turns over for a predetermined interval of time without starting. The device of the present invention also includes one or more thermostatic switches for stopping the motor after it has already been automatically started when the temperature within the passenger compartment attains a predetermined value.

Figure 2:
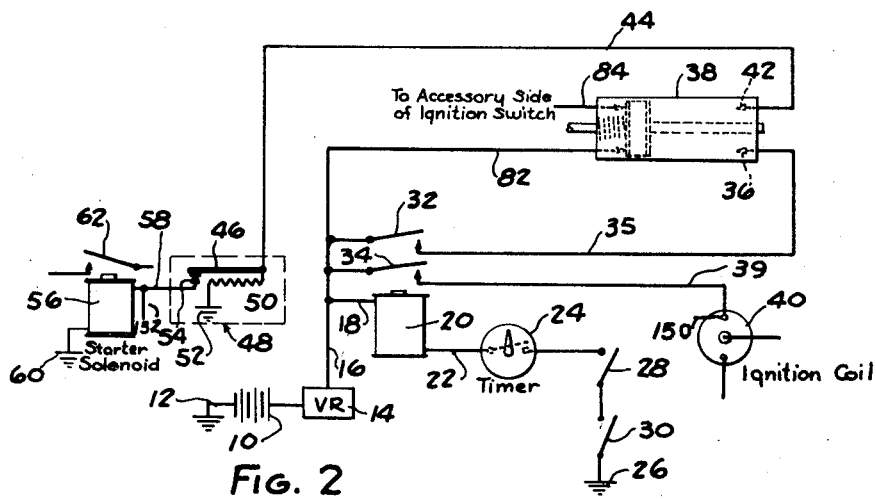
Fig. 2 is a wiring diagram illustrating the manner in which the device of this invention is incorporated in the electrical circuit of the automotive vehicle.

In the wiring diagram illustrated in Fig. 2, a portion of the electrical system of an automotive vehicle is illustrated. The vehicle battery is designated at 10. One side of the battery is grounded as at 12 while the other side of the battery is connected to the voltage regulator 14. The battery lead 16 from the voltage regulator connects with one end 18 of the coil of a continuous service relay 20. The other end 22 of the relay coil connects with one side of a switch 24 which, in the embodiment illustrated, is in the form of a manually set timer. The other side of switch 24 is connected to ground as at 26 through a manually actuated on-off switch 28 and a neutral switch 30. Switch 30 is a safety switch which is closed only when the engine transmission is in neutral. Switches of this type are well-known.

Relay 20 has a pair of armatures 32 and 34. When relay 20 is energized, armature 32 closes a circuit from battery 10 through a conductor 35 to a contact 36 on a vacuum switch 38. The energizing of relay 20 also causes armature 34 to close a circuit from the battery 10

Figure 3:
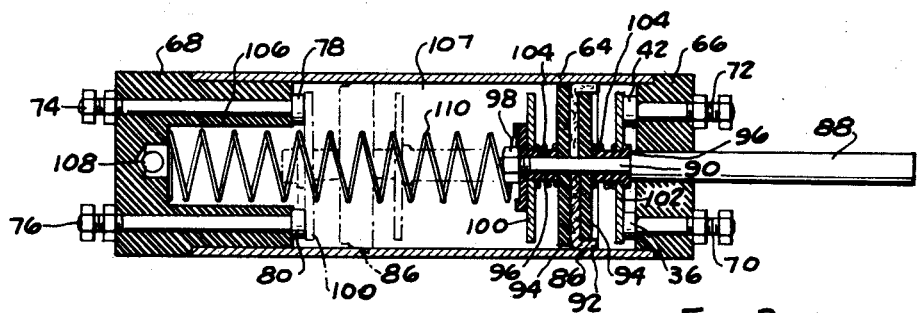
Fig. 3 is a sectional view of the vacuum switch forming part of the device.

Referring now to Fig. 3 wherein the details of vacuum switch 38 are shown, it will be observed that this switch comprises a cylinder 64 having insulator blocks 66, 68 closing the opposite ends thereof. Contacts 36 and 42 comprise the inner ends of terminal posts 70 and 72 that are mounted on the insulating block 66. The insulating block 68 likewise has a pair of terminal posts 74, 76 mounted thereon, the inner ends of these posts comprising contacts 78 and 80. The terminal post 76 is connected with battery conductor 16 by means of a conductor 82. The other terminal post 74 is connected by means of a conductor 84 with the accessory circuit of the vehicle so that when a circuit is established across terminals 74, 76, the accessory circuit of the vehicle, which may include a heater, an air conditioner and a radio, for example, is closed.

Within the cylinder 64, there is arranged a piston generally designated 86 that is mounted on a piston rod 88. Rod 88 is mounted for axial sliding movement within the insulating block 66. The inner end of rod 88 has a reduced end portion 90 which supports piston 86. This piston is in the form of a leather cup 92 clamped between a pair of discs 94. The discs 94 are in turn clamped between a pair of nylon spacers 96 which are retained in place by means of a nut 98 on the threaded end of the reduced portion 90 of the piston rod 88.

On opposite sides of the piston 86, there is slidably arranged on the spacers 96 contact discs 100 and 102. These discs are biased in opposite directions by means of coil springs 104. The insulating block 68 is formed with a central bore 106 which communicates with a vacuum passageway 108. A coil spring 110 has one end located within bore 106 and its other end acting against the nylon spacer 96 adjacent the nut 98. Spring 110 normally biases the piston rod 88 axially toward the right as viewed in Fig. 3 so that the contact plate 102 bridges the contacts 36, 42. When the piston 86 shifts to the left in response to a vacuum obtaining in the chamber 107 to the left of piston 86, as will be described more fully hereinafter, contact disc 100 bridges contact 78 and 80.

Figure 1:
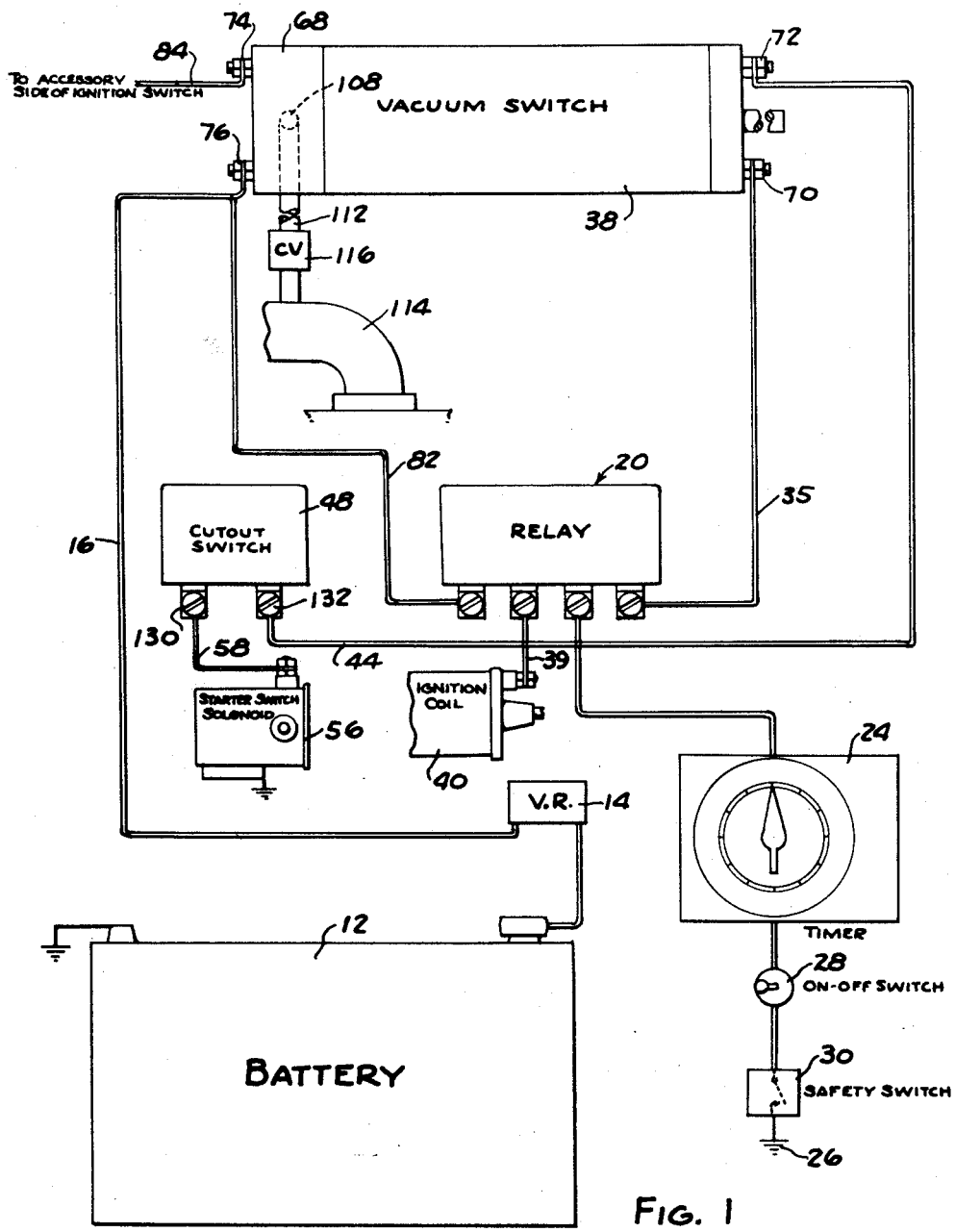
Fig. 1 is a diagrammatic view showing the general arrangement of the device of this invention.
Figure 4:
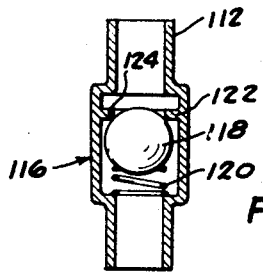
Fig. 4 is a fragmentary sectional view showing the check valve construction between the vacuum switch illustrated in Fig. 3 and the intake manifold of the engine.

Referring now to Fig. 1, it will be observed that the vacuum passageway 108 in the insulating block 68 is connected by a conduit 112 to the intake manifold 114 of the engine through a check valve 116. The construction of check valve 116 is illustrated in Fig. 4. This valve includes a ball check 118 which is normally biased by a spring 120 upwardly against a seat 122. Seat 122 is provided with radial slots 124 which prevent a complete seal between ball check 118 and seat 122.

The seat 122 with the slots 124 is designed to permit leakage of air past the check valve 116 at a predetermined rate. For example, when the high manifold vacuum is obtaining in the chamber to the left of piston 86 as viewed in Fig. 3 and the engine stops, ball check 118 will be biased upwardly against seat 122 by spring 120; but the vacuum will slowly leak past ball check 118 through the slots 124 so that a period of two or three seconds may elapse before piston 86 is shifted to the right under the influence of spring 110 to the position shown in full lines in Fig. 3 where contact disc 102 bridges contacts 36, 42.

Figure 5:
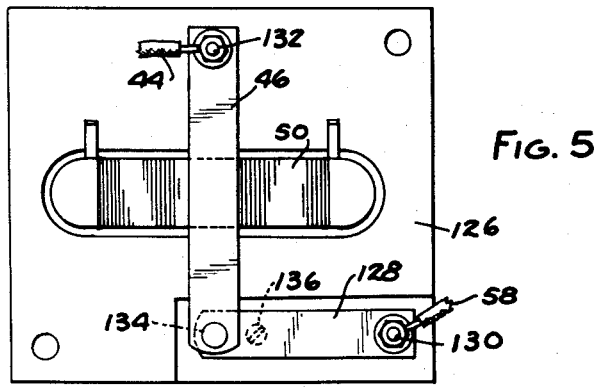
Figs. 5 and 6 are top and side elevational views, respectively, of a safety cut-out switch incorporated in the device.
Figure 6:
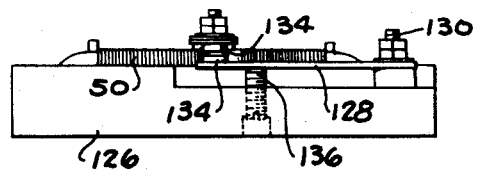

Referring now to Fig. 5 and Fig. 6, the construction of the safety cut-out switch 48 is there illustrated. This switch comprises an insulating support block 126 upon which a spring arm 128 is mounted as by means of the terminal post 130. The bi-metallic arm 46 is mounted on support block 126 as by terminal post 132. The free end of bi-metallic arm 46 overlies the free end of spring arm 128, and the ends of these arms have contacts 134 mounted thereon. Heater 50 is located beneath bi-metallic arm 46; and the arm 46 is so designed so that when the temperature thereof reaches a predetermined value in response to the energization of heater 50, arm 46 flexes outwardly to separate contacts 34.

Conductor 44 connects with terminal post 132 and conductor 58 connects with terminal post 130. An adjusting screw 136 is arranged in support block 126 so as to contact the underside of spring arm 128 adjacent the free end thereof. When screw 136 is advanced in an upward direction, the contact pressure between arms 128 and 46 is increased. Thus, the bi-metallic arm 46 under this condition must be subjected to a high temperature before it breaks contact with arm 128. Likewise, if screw 136 is retracted, bi-metallic arm 46 will break contact with spring arm 128 within a shorter interval of time after coil 50 is energized.

In operation, let us assume that the operator of the vehicle parks it overnight and is desirous of having the engine start automatically eight hours later. He will place the transmission in neutral so that switch 30 will close. Then, he will set the timer switch 24 for eight hours and snap the manual switch 28 to the "on" position. After a period of eight hours has elapsed, timer switch 24 closes and a circuit is established through the coil of relay 20 from battery 10 through conductors 16, 18, 22 and switches 24, 28, 30 to ground.

The energizing of relay 20 likewise closes circuits from the battery to the starter solenoid 56 and to the ignition coil 40. The latter circuit is closed through conductor 16, armature 34 and conductor 39. The circuit to the starter solenoid is closed through conductor 16, armature 32, conductor 35, contact 36, disc 94 (piston 86 will be held in the position shown in Fig. 3 under the influence of spring 110), contact 42, conductor 44, bi-metallic arm 46 and conductor 58. Thus, the starter circuit will be closed through switch 62 and the motor will turn over. At the same time, heater 50 will be energized.

If the motor does not start within the time interval set by screw 136 in cut-out switch 48, bi-metallic arm 46 will flex upwardly out of contact with spring arm 128 and the circuit to the starter solenoid 56 will be opened, thus preventing the battery from running down. As mentioned previously, the coil of relay 20 is of the continuous service type so that the fact that this coil is continuously energized is not detrimental. However, if the engine does start, the vacuum obtaining in the intake manifold 114 will reduce the pressure in chamber 107 in vacuum switch 38 and the piston will shift to the left to a position wherein contact disc 100 bridges contacts 78 and 80.

Thus, the circuit to the starter solenoid will be broken at contacts 36, 42 and a circuit will be completed to the accessory circuit of the vehicle from the battery through conductors 16 and 82, contacts 78 and 80, and conductor 84. If the heater switch is turned to the "on" position when the car was parked, it will automatically start when the engine is started. Thus, the vehicle can be left standing so that at a predetermined time, the engine will be started and also, when desired, accessories, such as the heater or an air conditioner. It will be observed that with the present arrangement, although the accessories may be energized upon starting of the engine, they are not in the starter circuit; and therefore, they will not impose a load on the battery during the starting of the engine.

The system described can also be utilized for automatically starting an engine if it should stall in the course of operation. This is accomplished by merely actuating the manual switch 28 to the "on" position during the course of normal operation of the car. As long as the car is in gear, the circuit to the starter solenoid will be open by reason of the neutral safety switch. However, if the engine should stall, then the operator merely places the transmission in neutral; and after two or three seconds (the time required for the vacuum in switch 38 to bleed through valve 116), piston 86 will be shifted by spring 110 to close the circuit to the starter solenoid through contacts 36, 42 and the engine will be automatically restarted.

Figure 7:
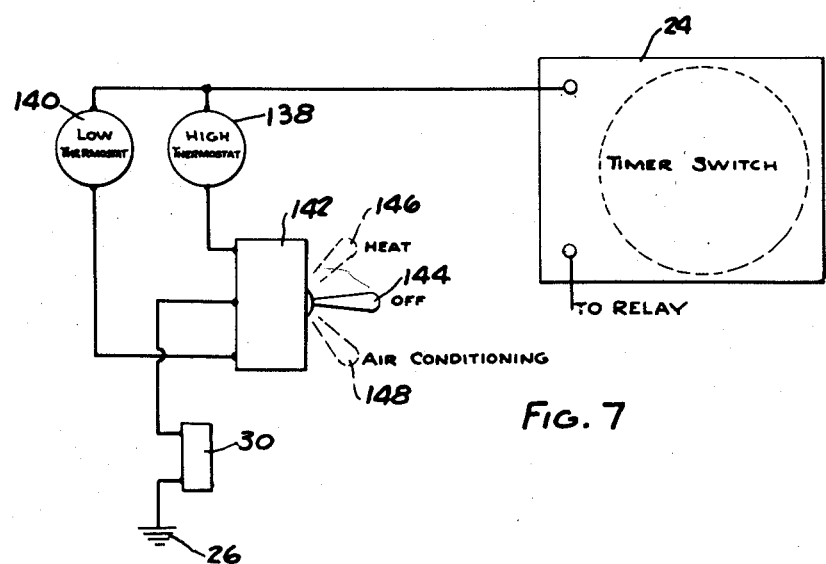
Fig. 7 is a diagrammatic view of a modified form of a device according to this invention.

The device of this invention may be utilized for automatically starting the automotive vehicle for the purpose of heating the passenger compartment in cold weather or for cooling the passenger compartment in hot weather. When the device of this invention is used for either or both of these purposes, it may be modified slightly as shown in Fig. 7 wherein a high limit thermostat 138 and a low limit thermostat 140 are utilized. These thermostats are utilized in conjunction with a three-position switch 142 which will replace switch 28. Switch 142 has an off position indicated at 144 which opens the circuit between the timer switch 24 and the neutral safety switch 30. Switch 142 has a "heat" position indicated at 146, in which position the switch closes the circuit between timer switch 24 and neutral switch 30 through the high limit thermostat 138. Switch 142 has a third position for air conditioning indicated at 148, at which position it closes the circuit between timer switch 24 and neutral switch 30 through the low limit thermostat 140.

Thermostats 138 and 140 can be suitably located so as to be responsive to the temperature within the passenger compartment. These thermostatic switches are normally closed. Thermostatic switch 138 is designed to open when the temperature within the passenger compartment reaches a predetermined high value, and thermostatic switch 140 is adapted to open when the temperature within the passenger compartment reaches a predetermined low value. Preferably, the thermostatic switches 138 and 140 are designed so as to operate within a range of temperatures. More specifically, switch 138 opens at one temperature and closes at a temperature say 10° below the temperature at which it opens. Likewise, switch 140 may be designed so that it opens at one temperature and closes at a temperature of say 10° higher than the temperature at which it opens.

With the arrangement shown in Fig. 7, the remaining portion of the system being the same, it will be appreciated that the temperature of the vehicle while parked can be maintained within a designated range. This is very desirable in very cold climates and very hot climates. In this connection, the arrangement shown in Fig. 7 also serves as a safety feature because it will prevent overheating of the engine by reason of operation for prolonged periods of time while the vehicle is parked.

It will be appreciated that the vehicle will also include the conventional ignition switch and starter switch. These two switches may be independent or may be combined into a single switch. In either event, the ignition switch, when closed, is arranged to close a circuit from the battery 10 to the ignition coil 40 through a conductor 150; and the starter switch, when closed, is arranged to close a circuit from battery 10 to the starter solenoid 56 through a conductor 152. Thus, with switch 28 or switch 142 in the "off" position, starting of the vehicle is in the conventional manner.

I claim:

1. In an electrical control system for an automotive vehicle having an electrical system including a motor starter and electrically operated accessories in circuit with a battery, means for automatically starting the motor comprising a vacuum operated switch in said circuit connected with the intake manifold of the motor, said switch being arranged to close the circuit to the motor starter and open the circuit to the accessories in response to a relatively high pressure in the intake manifold and to open the circuit to the motor starter and close the circuit to the accessories in response to a high vacuum in the intake manifold and a timer switch in said circuit for conditioning the circuit to open and close in response to the pressure obtaining in the intake manifold after a predetermined time interval, said circuit also including a thermostatic switch in circuit between said motor starter and said vacuum switch and a heater element in shunt relation to the thermostatic switch, said thermostatic switch being responsive to heat from the heater element to open the circuit to the motor starter after the elapse of a predetermined time interval subsequent to the energizing of said heater element to open the circuit to the motor starter after the elapse of a predetermined time interval subsequent to the energizing of said heater.

2. The combination called for in claim 1 wherein said thermostatic switch includes means for varying the length of said predetermined time interval.

3. In an electrical control system for an automotive vehicle having an electrical system including a motor starter and electrically operated accessories in circuit with a battery, means for automatically starting the motor comprising a vacuum operated switch in said circuit connected with the intake manifold of the motor, said switch being arranged to close the circuit to the motor starter and open the circuit to the accessories in response to a relatively high pressure in the intake manifold and to open the circuit to the motor starter and close the circuit to the accessories in response to a high vacuum in the intake manifold, a timer switch in said circuit for conditioning the circuit to open and close in response to the pressure obtaining in the intake manifold after a predetermined time interval and a thermostatic switch in said circuit for opening and closing the circuit in response to the temperature of the passenger compartment of the vehicle.

4. The combination called for in claim 3 wherein said thermostatic switch is arranged to open said circuit when the temperature of the passenger compartment falls to a predetermined value and to close said circuit when the temperature of said compartment rises to a predetermined value.

5. The combination called for in claim 3 wherein said thermostatic switch is arranged to open said circuit when the temperature in the passenger compartment rises to a predetermined value and to close said circuit when the temperature in said compartment falls to a predetermined value.

6. In an electrical control system for an automotive vehicle having an electrical system including a motor starter and electrically operated accessories in circuit with a battery, means for automatically starting the vehicle motor comprising a vacuum operated two-position switch connected with the intake manifold of the motor, said switch in one position closing a circuit from the battery to the motor starter and in the other position opening the circuit to the motor starter and closing the circuit to said accessories, said switch being biased to said first mentioned position and being responsive to the vacuum obtaining in the intake manifold when the engine is operating to move to said second mentioned position, a timer switch in said circuit adapted to close a circuit from the battery to the motor starter through said vacuum switch, a manually operable switch and a neutral switch, said last two mentioned switches being in series circuit with said timer switch, said neutral switch being closed only when the vehicle is in neutral gear and including a check valve in the connection between said vacuum switch and the intake manifold, said check valve being arranged to close when the pressure in the intake manifold is higher than in said switch, said check valve, when closed, permitting leakage of air into said switch at a predetermined rate whereby to provide a time delay between the stopping of the motor and the actuation of said vacuum switch to said first position.

7. In an electrical control system for an automotive vehicle having an electrical system including a motor starter and electrically operated accessories in circuit with a battery, means for automatically starting the vehicle motor comprising a vacuum operated two-position switch connected with the intake manifold of the motor, said switch in one position closing a circuit from the battery to the motor starter and in the other position opening the circuit to the motor starter and closing the circuit to said accessories, said switch being biased to said first mentioned position and being responsive to the vacuum obtaining in the intake manifold when the engine is operating to move to said second mentioned position, a timer switch in said circuit adapted to close a circuit from the battery to the motor starter through said vacuum switch, a manually operable switch and a neutral switch, said last two mentioned switches being in series circuit with said timer switch, said neutral switch being closed only when the vehicle is in neutral gear and including a thermostatic switch in series circuit between said vacuum switch and said motor starter and a heater element in shunt relation with said thermostatic switch and positioned adjacent said thermostatic switch such as to control the operation thereof, said heater element being adapted to open the circuit through said thermostatic switch after a predetermined time interval subsequent to being energized.

8. In an electrical control system for an automotive vehicle having an electrical system including a motor starter, an ignition mechanism and electrical operated accessories in circuit with a battery, means for automatically starting the vehicle motor comprising a relay and a timer switch in circuit with said battery, said relay, when energized, closing a circuit to said ignition means, a vacuum switch connected with the intake manifold of the motor, said vacuum switch normally closing a circuit from the battery to the engine starter when said relay is energized, said vacuum switch being responsive to the vacuum in the intake manifold upon the starting of the motor to open the circuit to the motor starter and close the circuit to said accessories, said vacuum switch comprising a cylinder having a pair of contacts at each end thereof, a piston within said cylinder having means thereon for bridging the contacts of each pair when the piston is at either end of the cylinder, the contacts at one end of the cylinder being connected one with the battery through said relay and the other with the motor starter, the contacts at the other end of the cylinder being connected one directly with the battery and the other with the accessories.

9. The combination called for in claim 8 including a piston rod mounted in one end of said cylinder for axial sliding movement therein, said piston being mounted on said rod, said contact bridging means comprising a pair of contact members mounted on said rod, one on each side of said piston.

10. The combination called for in claim 9 wherein said contact members on the piston rod comprise a pair of discs mounted on said rod for sliding movement axially of the rod and spring means interposed between each disc and the piston and biasing each disc axially away from the piston.

11. The combination called for in claim 8 including a thermostatic switch in series circuit with the timer switch and responsive to the temperature in the passenger compartment to open and close the circuit through said timer switch.

12. The combination called for in claim 11 wherein said thermostatic switch is arranged to open the circuit when the temperature of the passenger compartment falls to a predetermined value and to close said circuit when the temperature of said compartment rises to a predetermined value.

13. The combination called for in claim 11 wherein said thermostatic switch is arranged to open said circuit when the temperature in the passenger compartment rises to a predetermined value and to close said circuit when the temperature in said compartment falls to a predetermined value.

References Cited in the file of this patent

UNITED STATES PATENTS

| | | |
|---|---|---|
| 2,444,460 | Moncrief | July 6, 1948 |
| 2,504,670 | Everest | Apr. 18, 1950 |
| 2,579,958 | Perhats | Dec. 25, 1951 |
| 2,698,391 | Braden et al. | Dec. 28, 1954 |
| 2,707,463 | Booth | May 3, 1955 |
| 2,748,759 | Schiffer | June 5, 1956 |
| 2,817,022 | Comers | Dec. 17, 1957 |
| 2,859,296 | Neu | Nov. 4, 1958 |